(12) United States Patent
Kim et al.

(10) Patent No.: US 10,134,554 B2
(45) Date of Patent: Nov. 20, 2018

(54) CHARGING DEVICE OF AIR CIRCUIT BREAKER

(71) Applicant: LSIS CO., LTD., Anyang-si, Gyeonggi-do (KR)

(72) Inventors: Kyujung Kim, Anyang-si (KR); Seungpil Yang, Anyang-si (KR)

(73) Assignee: LSIS CO., LTD., Anyang-si, Gyeongg-Do (KR)

( * ) Notice: Subject to any disclaimer, the term of this patent is extended or adjusted under 35 U.S.C. 154(b) by 20 days.

(21) Appl. No.: 15/644,380

(22) Filed: Jul. 7, 2017

(65) Prior Publication Data

US 2018/0158637 A1 Jun. 7, 2018

(30) Foreign Application Priority Data

Dec. 5, 2016 (KR) .................. 10-2016-0164525

(51) Int. Cl.
| | |
|---|---|
| *H01H 75/02* | (2006.01) |
| *H01H 3/30* | (2006.01) |
| *H02K 5/24* | (2006.01) |
| *H02K 7/08* | (2006.01) |
| *F16C 21/00* | (2006.01) |

(52) U.S. Cl.
CPC .......... *H01H 75/02* (2013.01); *H01H 3/3005* (2013.01); *H02K 5/24* (2013.01); *H02K 7/081* (2013.01); *F16C 21/00* (2013.01); *F16C 2226/00* (2013.01); *H01H 2235/01* (2013.01); *H01H 2235/016* (2013.01)

(58) Field of Classification Search
CPC .......... H01H 9/22; H01H 9/226; H01H 71/04; H01H 11/10; H01H 11/127; H01H 3/30; H01H 3/20; H01H 9/20; H01H 33/6661; H01H 21/06; E05C 19/003; E05C 19/10; E05C 21/00; H02B 11/26; H02B 11/173
USPC ......... 200/50.24, 50.21, 50.26, 50.01, 50.17, 200/50.12, 401, 50.13, 327, 50.02, 50.03, 200/50.23, 50.25, 50.3
See application file for complete search history.

(56) References Cited

U.S. PATENT DOCUMENTS

| | | |
|---|---|---|
| 4,223,853 A | 9/1980 | Ernst |
| 5,213,000 A | 5/1993 | Saya et al. |
| 6,288,464 B1 | 9/2001 | Torii et al. |

(Continued)

FOREIGN PATENT DOCUMENTS

| | | |
|---|---|---|
| CA | 733193 A | 4/1966 |
| DE | 1953673 U | 1/1967 |

(Continued)

OTHER PUBLICATIONS

European Search Report for related European Application No. 17179088.4; report dated Jan. 18, 2018; (7 pages).

(Continued)

*Primary Examiner* — Ahmed Saeed
(74) *Attorney, Agent, or Firm* — K&L Gates LLP

(57) ABSTRACT

A first support member and a second support member are provided in a rotation support device and a worm gear is rotated in a state that the second support member is inserted in the first support member, whereby the worm gear is prevented from being shaken through the first support member and the second support member and heat transmission to a housing due to rotation of the worm gear to damage the housing is prevented.

5 Claims, 7 Drawing Sheets

(56) References Cited

U.S. PATENT DOCUMENTS

| | | | | |
|---|---|---|---|---|
| 6,777,627 B1* | 8/2004 | Stevenson | ................ | H02B 3/00 |
| | | | | 200/50.21 |
| 6,951,990 B1* | 10/2005 | Miller | .................. | H02B 11/127 |
| | | | | 200/50.21 |
| 7,057,123 B1* | 6/2006 | Jenkins | ................ | H02B 11/133 |
| | | | | 200/50.23 |
| 2011/0147173 A1* | 6/2011 | Lee | ...................... | H02B 11/127 |
| | | | | 200/50.25 |
| 2012/0085628 A1* | 4/2012 | Pearce | .................... | H01H 9/22 |
| | | | | 200/50.24 |
| 2012/0199450 A1* | 8/2012 | Bower | ................. | H02B 11/127 |
| | | | | 200/50.25 |
| 2015/0029633 A1 | 1/2015 | Wan | | |

FOREIGN PATENT DOCUMENTS

| | | |
|---|---|---|
| JP | 07-071491 | 3/1995 |
| JP | 07-029720 | 6/1995 |
| JP | 2919763 B2 | 7/1999 |
| KR | 100850422 B1 | 8/2008 |
| KR | 2020100001424 | 2/2010 |
| KR | 20110060573 | 6/2011 |
| KR | 1020150118663 A | 10/2015 |

OTHER PUBLICATIONS

Korean Office Action for related Korean Application No. 10-2016-0164525; action dated Dec. 19, 2017; (4 pages).
Korean Intellectual Property Office Search report dated Sep. 13, 2016, 3 pages.

* cited by examiner

CHARGING DEVICE OF AIR CIRCUIT BREAKER

CROSS-REFERENCE TO RELATED APPLICATION

Pursuant to 35 U.S.C. § 119(a), this application claims the benefit of earlier filing date and right of priority to Korean Application No. 10-2016-0164525, filed on Dec. 5, 2016, the contents of which are all hereby incorporated by reference herein in its entirety.

BACKGROUND OF THE DISCLOSURE

1. Field of the Disclosure

The present disclosure relates to a charging device of an air circuit breaker, and particularly, to a charging device of an air circuit breaker having a rotation support device capable of preventing a worm gear from being shaken when the charging device is driven and preventing thermal damage due to rotation of the worm gear.

2. Background of the Disclosure

In general, an air circuit breaker (ACB) is a device in which a stationary contactor and a movable contactor, which is movable to a closing position in which the movable contactor contacts the fixing contactor to close a conducting circuit and to a breaking (trip) position in which the movable contactor is separated from the stationary contactor to open the conducting circuit, are always contacted to allow a current to flow, and when an overcurrent occurs due to failure of a line, the movable contactor is rapidly separated from the stationary contactor to cut off current to protect an internal circuit and components within an electronic device form the overcurrent, and in order to extinguish an arc generated at this time, both contactors are exposed in the air and compressed air is provided.

The air circuit breaker has an operating device capable of rapidly breaking/separating contacts of the stationary contactor and the movable contactor, and a driving method of the operating device includes a manual operating method, a solenoid operating method, and an electric spring operating method.

Referring to the electric spring operating method, generally, a closing spring is coupled to one side of a cam shaft in which a charging cam contacting a link connected to the movable contactor is installed and a charging device for rotating the cam shaft using an electric or manual operating lever using a motor is connected to the cam shaft, whereby the cam shaft is rotated in a state that main energy for adding rotation moment is charged to a closing spring to the maximum level using the charging device, and, if necessary, a lock is released and the cam shaft is rotated by energy from the compressed closing spring to sequentially operate a link to separate the movable contactor from the stationary contactor to cut off a current.

Meanwhile, FIG. 1 is a perspective view illustrating a conventional air circuit breaker, FIG. 2 is a cross-sectional view illustrating a charging device provided in the conventional air circuit breaker, and FIG. 3 is another cross-sectional view illustrating a charging device provided in the conventional air circuit breaker.

As illustrated in FIGS. 1 to 3, the charging device provided in the conventional air circuit breaker includes a driving motor 11 and a charging gear module 13 having a plurality of gears connected to the driving motor 11 and rotated according to driving of the driving motor 11.

The charging gear module 13 includes a worm gear 13a connected to the driving motor 11 and rotated according to driving of the driving motor 11, a worm wheel 13b positioned to be adjacent to the worm gear 13a and engaged with the worm gear 13a so as to be rotated, a spur gear (not shown) connected to the worm wheel 13b through a rotational shaft, a first charging gear unit 13c rotated according to rotation of the spur gear, and a second charging gear unit 13d and a planetary gear 13f. When a mechanism shaft (not shown) driving a closing spring (not shown) is rotatably connected to a shaft 13e penetrating through the second charging gear unit 13d and the planetary gear 13f and the shaft 13e is rotated according to rotation of each gear, the mechanism shaft rotates in association to drive a mechanism to compress the closing spring.

Here, one end of the worm gear 13a is connected to the driving motor 11, and the other end of the worm gear 13a is inserted into a rotation support device 15 to prevent shaking when the worm gear 13a is rotated.

However, since the rotation support device 15 provided in the air circuit breaker 10 is positioned such that the warm gear 13a is inserted within a housing forming the rotation support device 15, excessive rotation of the worm gear 3a may cause significant shaking to generate significant vibrations and noise in the charging device.

Also, when the worm gear 13a is excessively rotated, an external housing of the rotation support device 15 may be damaged by heat generated through rotation of the worm gear 13a, and due to the damage, malfunction frequently occurs when the charging device is driven.

SUMMARY OF THE DISCLOSURE

Therefore, an aspect of the detailed description is to provide a charging device of an air circuit breaker having a rotation support device capable of preventing a worm gear from being shaken when the charging device is driven and preventing thermal damage due to rotation of the worm gear.

To achieve these and other advantages and in accordance with the purpose of this specification, as embodied and broadly described herein, a charging device of an air circuit breaker including a worm gear rotated to provide power for charging a closing spring through a driving motor and a rotation support device into which the worm gear is inserted and supported, wherein the rotation support device includes: a housing; a first support member provided within the housing, allowing the worm gear to be inserted therein and preventing shaking when the worm gear rotates, and having a rotation preventing part preventing rotation in association with rotation of the worm gear; and a second support member provided at one end of the worm gear and positioned within the first support member together with the worm gear to prevent shaking when the worm gear rotates.

Also, the second support member may be formed as a ball bearing.

Also, an outer circumferential surface of the ball bearing may be inserted to contact an inner surface of the first support member to prevent shaking of the worm gear.

Also, an outer circumferential surface of the rotation preventing part has a sawtooth shape.

Also, at least one rotation preventing part may be positioned to protrude from an outer circumferential surface of the first support member.

A cross-section of the rotation preventing part may have a triangular or quadrangular shape.

As described above, in the charging device of an air circuit breaker according to the present disclosure, since the first support member and the second support member are provided in the rotation support device and the worm gear is rotated in a state that the second support member is inserted in the first support member, the worm gear is prevented from being shaken through the first support member and the second support member and heat transmission to the housing due to rotation of the worm gear to damage the housing is prevented.

Also, since the second support member is configured as a ball bearing, the worm gear is prevented from being shaken and frictional force of the second support member and the first support member is minimized.

Also, since the rotation preventing part is formed in the first support member, shaking of the worm gear through the first support member is prevented and rotation of the first support member in association with rotation of the worm gear may be prevented.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter a charging device of an air circuit breaker according to an embodiment of the present disclosure will be described with reference to the accompanying drawings.

Figure 1:
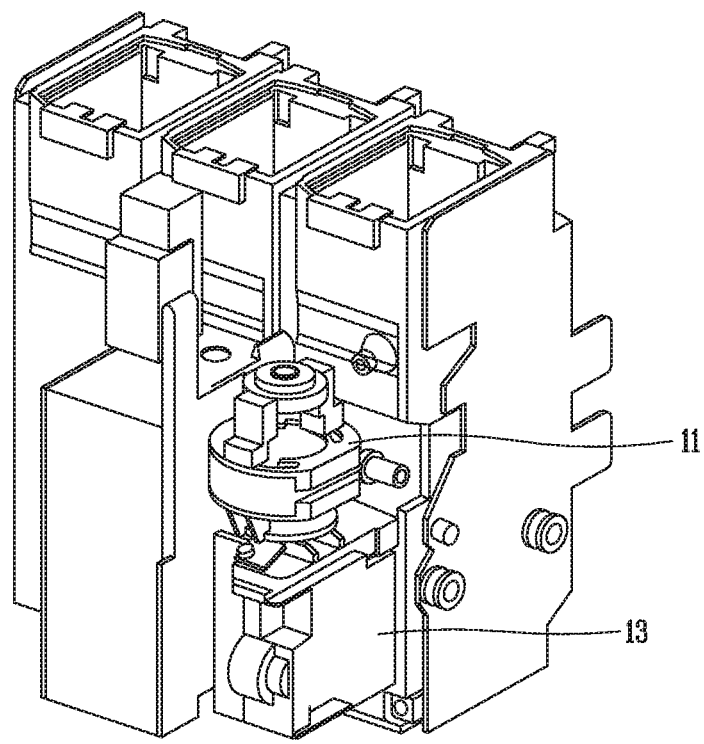
FIG. 1 is a perspective view illustrating the conventional air circuit breaker.
Figure 2:
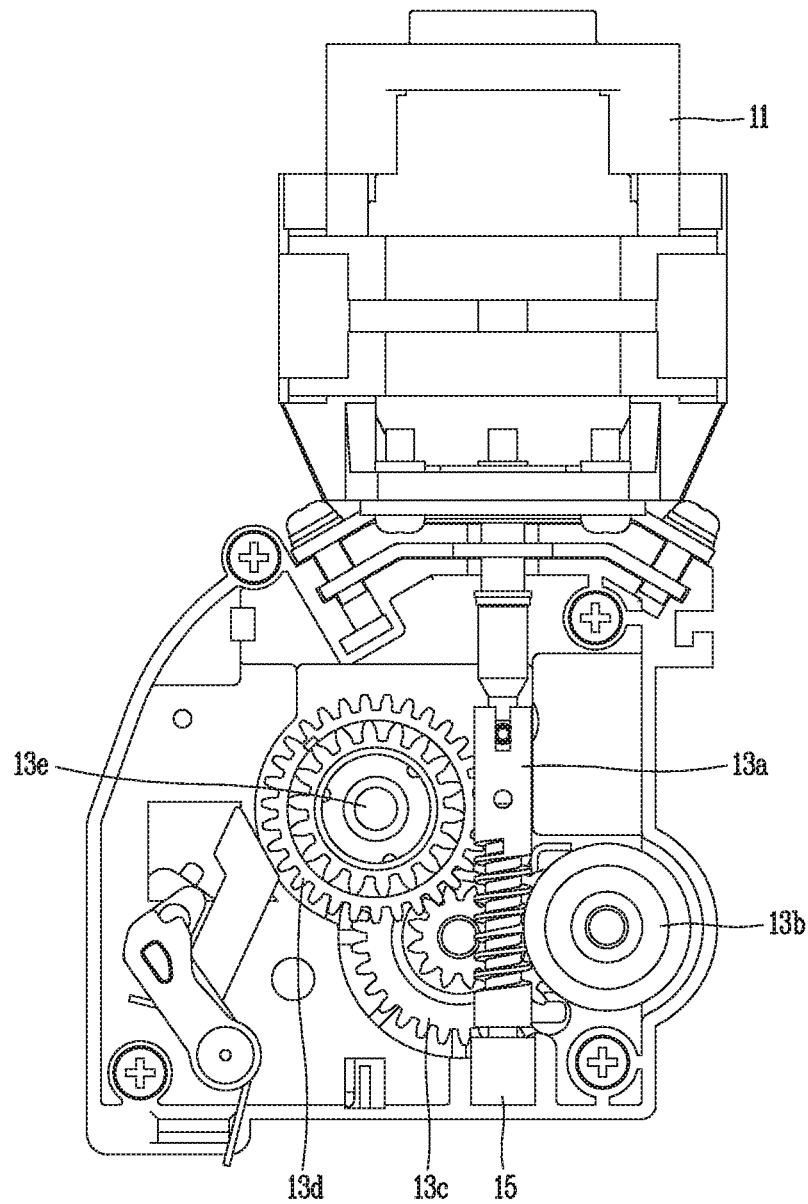
FIG. 2 is a cross-sectional view illustrating a charging device provided in the conventional air circuit breaker.
Figure 3:
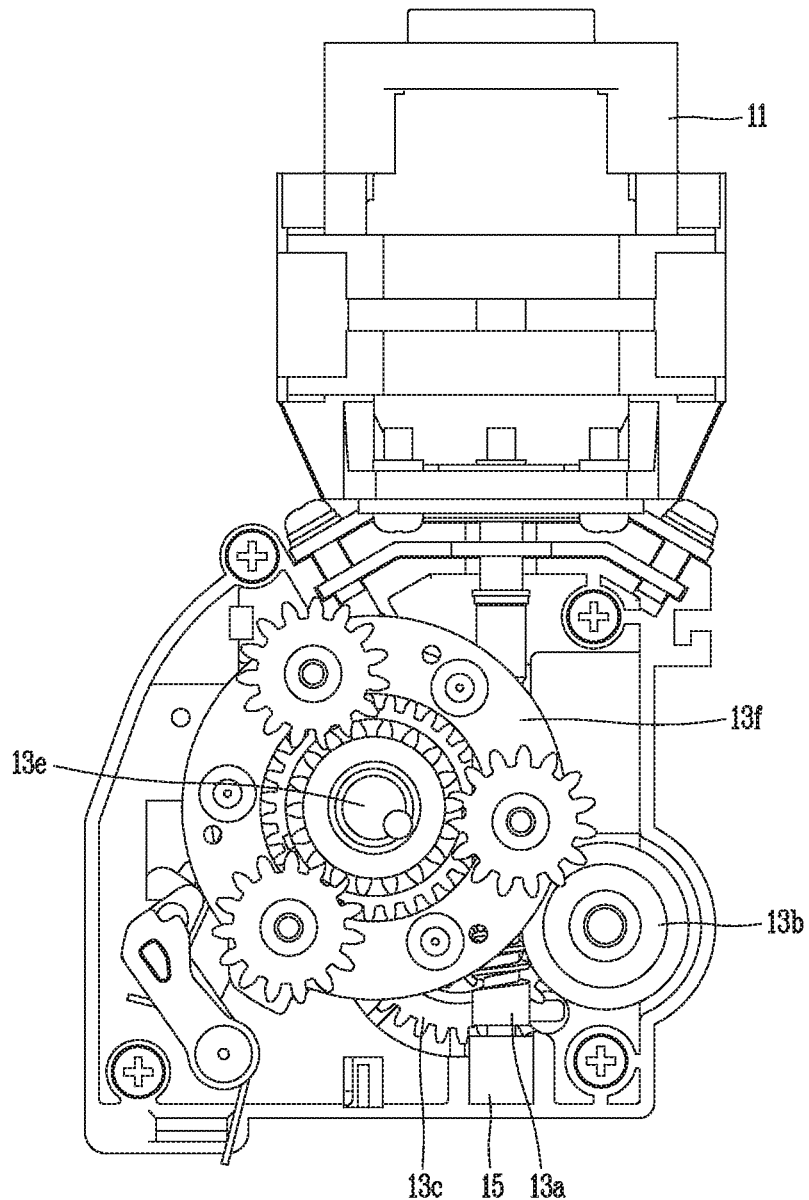
FIG. 3 is another cross-sectional view illustrating a charging device provided in the conventional air circuit breaker.
Figure 4:
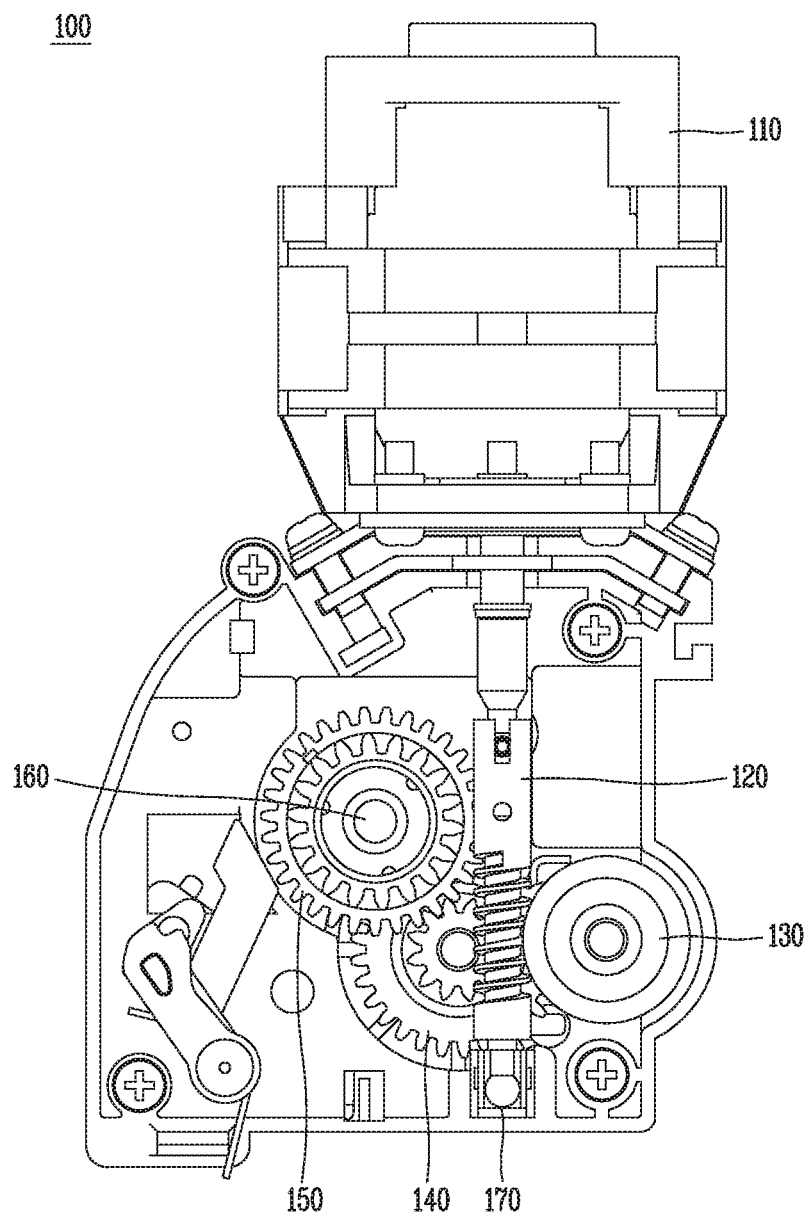
FIG. 4 is a cross-sectional view illustrating a charging device having a rotation support device according to an embodiment of the present disclosure.
Figure 5:
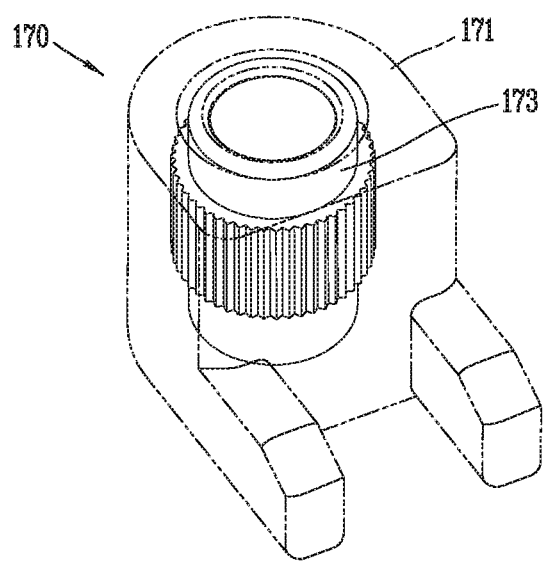
FIG. 5 is a perspective view illustrating a rotation support device provided in a charging device of an air circuit breaker according to an embodiment of the present disclosure.
Figure 6:
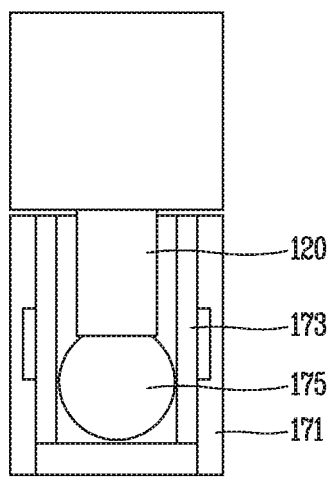
FIG. 6 is a cross-sectional view illustrating a rotation support device provided in a charging device of an air circuit breaker according to an embodiment zo of the present disclosure.

FIG. 4 is a cross-sectional view illustrating a charging device having a rotation support device according to an embodiment of the present disclosure, FIG. 5 is a perspective view illustrating a rotation support device provided in a charging device of an air circuit breaker according to an embodiment of the present disclosure, and FIG. 6 is a cross-sectional view illustrating a rotation support zo device provided in a charging device of an air circuit breaker according to an embodiment of the present disclosure.

Figure 7:
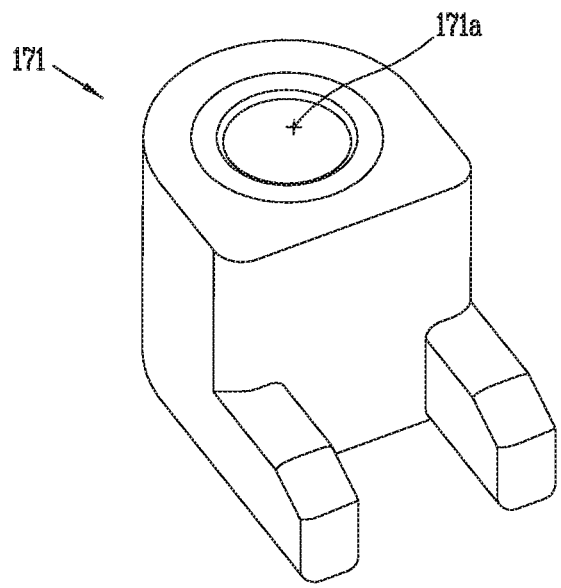
FIG. 7 is a perspective view illustrating a housing forming a rotation support device according to an embodiment of the present disclosure.
Figure 8:
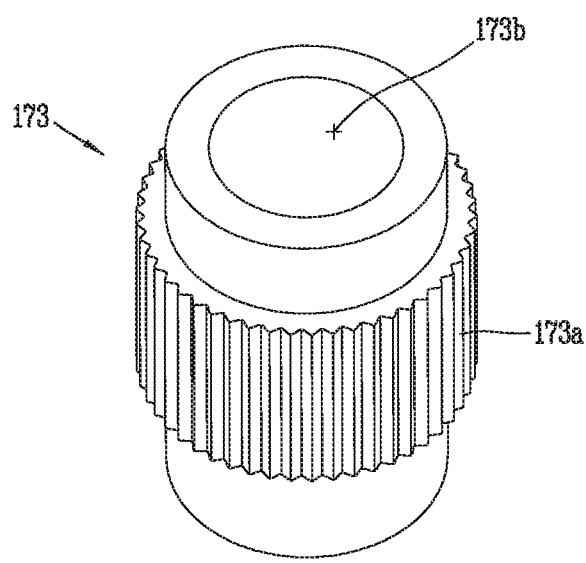
FIG. 8 is a perspective view illustrating a first support member forming a rotation support device according to an embodiment of the present disclosure.
Figure 9:
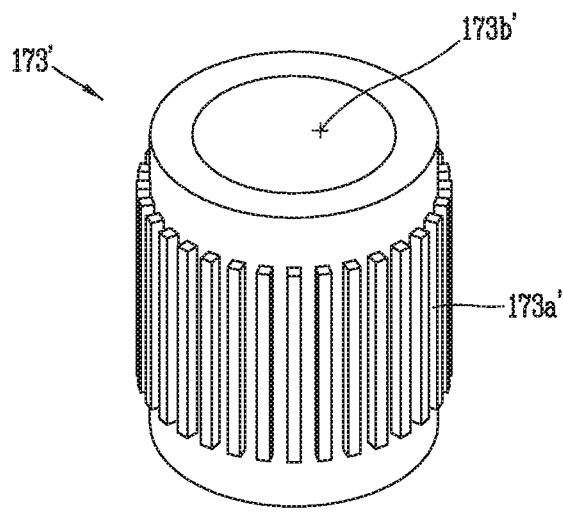
FIG. 9 is a perspective view illustrating a first support member forming a rotation support device according to another embodiment of the present disclosure.
Figure 10:
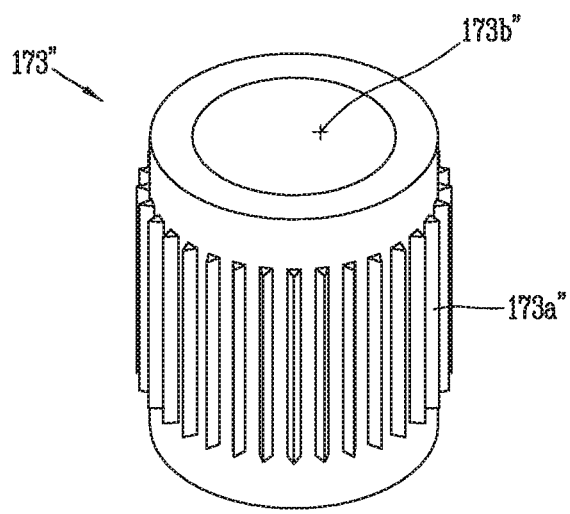
FIG. 10 is a perspective view illustrating a first support member forming a rotation support device according to still another embodiment of the present disclosure.

Also, FIG. 7 is a perspective view illustrating a housing forming a rotation support device according to an embodiment of the present disclosure, FIG. 8 is a perspective view illustrating a first support member forming a rotation support device according to an embodiment of the present disclosure, FIG. 9 is a perspective view illustrating a first support member forming a rotation support device according to another embodiment of the present disclosure, and FIG. 10 is a perspective view illustrating a first support member forming a rotation support device according to still another embodiment of the present disclosure.

As illustrated in FIG. 4, a charging device 100 of an air circuit breaker according to the present disclosure includes a driving motor 110 transmitting driving force for charging a closing spring (not shown), a worm gear 120 connected to the driving motor 110 and rotated by driving force from the driving motor 110, a worm wheel 130 positioned to be engaged with the worm gear 120 and rotated cooperatively according to rotation of the worm gear 120, a spur gear (not shown) connected to the worm wheel 130 through a rotational shaft, a first charging gear part 140 positioned to be engaged with the spur gear and cooperatively rotated according to rotation of the spur gear, a second charging gear part 150 positioned to be engaged with the first charging gear part 140 and rotating in association with the first charging gear part 140, and a shaft 160 rotated according to rotation of the second charging gear part 150 and connected to a mechanism (not shown) operated to compress the closing spring.

Here, one end of the worm gear 120 is connected to the driving motor 110 and the other end of the worm gear 120 is inserted into a rotation support device 170 provided in the charging device 100 to prevent shaking when the worm gear 120 rotates.

Thus, when the driving motor 110 operates, the worm gear 120 is rotated by the driving motor 110, each of the gear parts 130, 140, and 150 formed to rotate in association therewith rotates, and the shaft 160 and a mechanism shaft (not shown) connected to the shaft 160 simultaneously rotate, whereby the closing spring is compressed or released from a compressed state according to the operation of the mechanism.

As illustrated in FIGS. 5 and 6, the rotation support device 170 includes a housing 171, a first support member 173, and a second support member 175.

The housing 171 is made of plastic, or the like, forms an outer shape of the rotation support device 170, and is coupled to the charging device 100 such that the rotation support device 170 is provided in the charging device 100.

Also, as illustrated in FIG. 7, a first support member installation recess 171a is formed at a central part of the housing 171 so that the first support member 173 is installed and fixed, and in a state that the first support member 173 is installed and housed in the first support member installation recess 171a, the worm gear 120 is inserted and positioned in the first support member 173.

The first support member 173 in a state of being installed in the first support member installation recess 171a is provided within the housing 171, and prevents the worm gear 120 from being shaken together with the second support member 175 when the worm gear 120 rotates according to driving of the driving motor 110.

Also, as illustrated in FIG. 8, a worm gear insertion recess 173b is formed in the first support member 173 such that the worm gear 120 and the second support member 175 are inserted.

As the worm gear 120 and the second support member 175 formed in the worm gear 120 are inserted together into the worm gear insertion recess 173b, the worm gear 120 is prevented from being shaken when rotated through the first support member 173 and the second support member 175.

That is, the second support member 175 is formed as a ball bearing, or the like, and is connected to the other end of the worm gear 120 through welding, or the like. When the ball bearing 175 is inserted into the worm gear insertion recess 173b of the first support member 173, an outer circumferential surface of the ball bearing 175 is inserted to contact an inner surface of the first support member 173 in the worm gear insertion recess 173b, and thus, when the worm gear 120 rotates, the worm gear 120 is prevented from being shaken through the ball bearing 175 and the first support member 173 to which the ball bearing 175 is inserted.

Also, since the ball bearing 175 is used to prevent shaking of the worm gear 120, the ball bearing 175 rotates in a state of point-contacting with the worm gear insertion recess 173b of the first support member 173, whereby frictional force with the first support member 173 is minimized, while preventing shaking of the worm gear 120 when the worm gear 120 is rotated.

The first support member 173 further includes a rotation preventing part 173a preventing the first support member 173 from rotating in association when the worm gear 120 rotates.

When the first support member 173 is installed in the first support member installation recess 171a of the housing 171, the rotation preventing part 173a is engaged with an inner surface of the housing 171 to prevent the first support member 173 from rotating in association with rotation of the worm gear 120.

Here, an outer circumferential surface of the rotation preventing part 173a has a sawtooth shape and the rotation preventing part 173a is firmly engaged with the inside of the housing 171 to effectively prevent rotation of the first support member 173.

Also, as illustrated in FIGS. 9 and 10, at least one rotation preventing parts 173a' and 172a" according to another embodiment of the present disclosure may be formed to protrude from an outer circumferential surface of the first support member 173' or 173" where the worm gear insertion recess 173b' or 173b" is formed, and a cross-section of the rotation preventing parts 173a' or 173a" may have a quadrangular or triangular shape.

However, a shape of the rotation preventing parts 173a' and 173a" is not limited thereto and the rotation preventing parts 173a' and 173a" may have various shapes capable of effectively preventing rotation of the first support member 173.

As described above, in the present disclosure configured as described above, since the first support member 173 and the second support member 175 are provided in the rotation support device 170 provided in the charging device 100 and the worm gear 120 is rotated in a state that the second support member 175 is inserted in the first support member 173, the worm gear 120 is prevented from being shaken through the first support member 173 and the second support member 175 and heat transmission to the housing 171 due to rotation of the worm gear 120 to damage the housing 171 is prevented.

Also, since the second support member 175 is configured as a ball bearing, the worm gear 120 is prevented from being shaken and frictional force of the second support member 175 and the first support member 173 is minimized.

Also, since the rotation preventing part 173a is formed in the first support member 173, shaking of the worm gear 120 through the first support member 173 is prevented and rotation of the first support member 173 in association with rotation of the worm gear 120 may be prevented.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the to foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A charging device of an air circuit breaker including a worm gear rotated to provide power for charging a closing spring through a driving motor and a rotation support device into which the worm gear is inserted and supported, wherein the rotation support device comprises:
   a housing;
   a first support member provided within the housing, allowing the worm gear to be inserted therein and preventing shaking when the worm gear rotates, and having a rotation preventing part preventing rotation in association with rotation of the worm gear; and
   a second support member provided at one end of the worm gear and positioned within the first support member together with the worm gear to prevent shaking when the worm gear rotates, wherein the second support member is formed as a ball bearing to prevent shaking when the worm gear rotates.

2. The charging device of claim 1, wherein an outer circumferential surface of the ball bearing is inserted to contact an inner surface of the first support member to prevent shaking of the worm gear.

3. The charging device of claim 1, wherein an outer circumferential surface of the rotation preventing part has a sawtooth shape.

4. The charging device of claim 1, wherein at least one rotation preventing part is positioned to protrude from an outer circumferential surface of the first support member.

5. The charging device of claim 4, wherein a cross-section of the rotation preventing part has a triangle or quadrangular shape.

\* \* \* \* \*